Patented Dec. 18, 1934

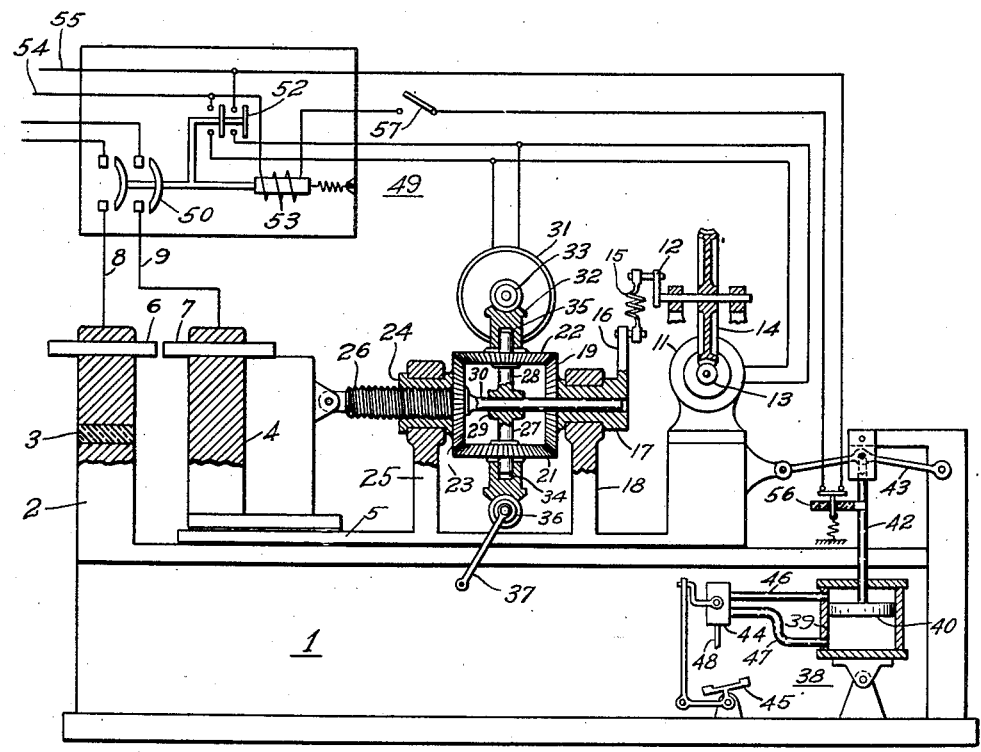

1,984,988

UNITED STATES PATENT OFFICE 1,984,988

WELDING METHOD

Wilhelm Raupach and Friedrich Kalkner, Nuremberg, Germany, assignors to Westinghouse Electric and Manufacturing Company, a corporation of Pennsylvania Application November 12, 1931, Serial No. 574,548
In Germany November 13, 1930

7 Claims. (Cl. 219—4)

This invention relates, generally, to electric welding and it has particular relation to resistance welding.

The object of the invention, generally stated, is the provision of a resistance welding machine that shall be simple and efficient in operation and readily and economically manufactured and installed.

A more specific object of the invention is the provision of a welding machine which will cause the repeated engagement and disengagement of the parts to be welded together while they are connected to a welding circuit.

A further object of the invention is to provide for compensating for the burning away of parts being welded together through the action of an electric arc.

A still further object of the invention is to provide for applying pressure to the parts being welded to complete the welding operation.

Other objects of the invention will, in part, be obvious and, in part, appear hereinafter.

The invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of the invention, reference may be had to the following detailed description taken in connection with the accompanying drawing, in which the single figure is a view, partly in side elevation and partly in section, showing a welding machine, constructed in accordance with this invention, together with a diagrammatic representation of electric circuits which may be used for controlling the operation of the machine.

Referring now to the drawing, 1 designates a main frame on one end of which a support 2 is provided. The upper and lower portions of the support 2 are insulated from each other by means of an insulator 3, the purpose of which will be set forth hereinafter. A second support 4 is slidably mounted on a base 5 which, in turn, is slidably mounted on the main frame 1.

The parts or blanks 6 and 7, which are to be welded together, are secured by any suitable clamping means to the supports 2 and 4, as illustrated. A welding circuit, comprising the conductors 8 and 9, is connected to the blanks 6 and 7 to provide power for performing the welding operation for which either alternating or direct current may be used.

In order to perform the welding operation, according to this invention, the blanks 6 and 7 are caused to repeatedly engage and disengage, thereby permitting their contiguous edges to be alternately heated by the current passing through them while they are engaged and by the arc which is drawn when they are separated. The desired oscillatory motion of the blank 7 with respect to the blank 6 is provided by means of a motor 11 which is disposed to rotate a crank 12 through the operation of a worm 13 and a cooperating gear 14.

The motion of the crank 12 is transmitted by means of a spring 15 to a crank arm 16 which is secured to a hollow shaft 17 that is rotatably mounted in a suitable bearing 18, extending upwardly from the slidable base 5. A drive gear 19 is fastened to the shaft 17 and is disposed to engage a pair of bevel gears 21 and 22 which engage a bevel gear 23 carried by a rotatable, internally threaded, flanged nut 24. As illustrated, the flanged nut 24 is rotatably mounted in an upwardly extending bearing 25, mounted on the base 5, and is disposed to engage a suitably threaded screw 26 which is attached to the slidable support 4.

It will be observed that the pair of bevel gears 21 and 22 are rotatably mounted on transverse shafts 27 and 28, the outer ends of which extend through and beyond the gears 21 and 22 and the inner ends of which terminate in a bearing 29 which is mounted on a longitudinal shaft 30. The shaft 30 is secured at one end to the bevel gear 23 and rotatably disposed within the hollow shaft 17 at the other end.

It will be readily understood that, if the welding operation is performed only by the operation of the motor 11, in conjunction with the customary welding circuit, the edges of the blanks 6 and 7, that are being welded together, will be rapidly burned away by the action of the electric arc drawn therebetween with the result that it may not be possible to satisfactorily perform the welding operation. In order to compensate for the burning action of the electric arc and to progressively move the blank 7 toward the blank 6, while it is being oscillated with respect to the latter, a motor 31 is provided which serves to rotate a ring gear 32 through a worm 33. As shown in the drawing, the ring gear 32 is provided with inwardly extending recesses 34 and 35 in which the ends of the transverse shafts 27 and 28 may be located. It will then be observed that the motor 31 will provide a continuous forward feeding motion for progressively moving the blank 7 toward the blank 6, while the former is repeatedly caused to engage and disengage the latter because of the action of the oscillating mechanism operated by the motor 11. In addition to the provision of the motor 31 for progressively moving the blank 7 in a forward direction, a second worm 36 is also provided which may be manually turned by means of a handle 37 to obtain the desired rate of feeding.

It is desirable to complete the welding operation by forcing the two blanks 6 and 7 into close mutual engagement after they have been suitably heated during the welding process as hereinbefore described. This final operation is accomplished by moving the entire base 5 to the left, as viewed in the drawing, by means of a hydraulic or other suitable device shown, generally, at 38.

The hydraulic device 38 comprises a cylinder 39 within which a piston 40 is slidably mounted. The movement of the piston 40 is transmitted by means of a connecting rod 42 to a toggle mechanism 43 one end of which is secured as illustrated, to the slidable base 5, while the other end is fastened to the main frame 1.

The operation of the hydraulic device 38 is controlled by means of a valve 44 of any suitable construction, which is manually operated by means of a foot pedal 45 and which is connected to the cylinder 39 by means of pipes 46 and 47. Any suitable operating fluid, such as air, oil or water may be supplied under suitable pressure to the valve 44 through an intake pipe 48.

With a view to preventing further operation of the welding machine after the final pressure has been applied, control apparatus, shown generally at 49, is provided. The control apparatus 49 comprises a circuit breaker 50 which is connected, in the main welding circuit, to the conductors 8 and 9 and an auxiliary switch 52 which is mechanically connected to operate simultaneously with the circuit breaker 50. A solenoid 53 is provided for operating the circuit breaker 50 and it may be energized from any suitable source of power to which the auxiliary circuit comprising the conductors 54 and 55 may be connected.

An auxiliary switch 56, the operating lever of which may be carried by the connecting rod 42, serves to control the circuit breaker 50 to open the welding circuit on application of pressure to the blanks 6 and 7 by the operation of the hydraulic device 38. It will be observed that the motors 11 and 31 will also be deenergized when the pressure is applied, since they are connected to the auxiliary source of power through the auxiliary switch 52 which, as set forth hereinbefore, is opened simultaneously with opening of the circuit breaker 50.

In operation, the blanks 6 and 7 are clamped to their respective supports 2 and 4 and the starting switch 57 is closed. Upon the closure of the switch 57, the solenoid 53 is energized to effect the closure of the breaker 50 and the auxiliary switch 52 thereby energizing the motors 11 and 31. The rate of progressive forward feeding by the motor 31 may be controlled or adjusted by varying the speed of the motor by any suitable means to obtain the desired speed for compensating for the burning away of the edges of the blanks 6 and 7. After the desired number of contact engagements have been made between the blanks 6 and 7 by the motor 11, the foot pedal 45 is actuated by the operator and the final pressure is applied to complete the welding process. At the same time, the electric power for operating the machine will be cut off through the opening of the auxiliary switch 52, as set forth in detail hereinbefore.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

We claim as our invention:

1. Welding apparatus comprising, in combination, a fixed support for a welding blank, a slidable support for a second welding blank, said slidable support being disposed to move the second welding blank into engagement with the first-mentioned welding blank, a welding circuit connected to said welding blanks, a screw secured at one end to the slidable support, a rotatable nut disposed in cooperative relation with said screw, means tending to continually rotate the nut to feed the screw forwardly, and means for repeatedly reversing the direction of rotation of the nut to cause said welding blanks to engage and disengage for drawing and extinguishing an arc formed therebetween by the welding circuit to perform the welding operation.

2. Welding apparatus comprising, in combination, a fixed support for a welding blank, a slidable support for a second welding blank, said slidable support being disposed to move the second welding blank into engagement with the first-mentioned welding blank, a welding circuit connected to said welding blanks, a screw secured at one end to the slidable support, a rotatable nut disposed in cooperative relation with said screw, means tending to continually rotate the nut to feed the screw forwardly, means for repeatedly reversing the direction of rotation of the nut to cause said welding blanks to engage and disengage for drawing and extinguishing an arc formed therebetween by the welding circuit to perform the welding operation, and manually operable means for forcing said blanks into mutual engagement under pressure to complete the welding operation.

3. Welding apparatus comprising, in combination, a fixed support for a welding blank, a movable support for a second welding blank, a welding circuit connected to said welding blanks, a main switch provided in the welding circuit, a motor, oscillating means disposed to be operated by said motor and connected to said movable support for causing the second welding blank to repeatedly engage and disengage said first-named welding blank, thereby, respectively, extinguishing and drawing a welding arc, a second motor, means disposed to be operated by said second motor for cooperating with said oscillating means to progressively move the second welding blank toward the first welding blank, an auxiliary circuit, an auxiliary switch disposed to operate simultaneously with said main switch for connecting said auxiliary circuit to said motors, fluid pressure means for forcing said blanks into mutual engagement to complete the welding operation, and circuit opening means disposed to be operated on the operation of said fluid pressure means for opening the main switch.

4. Welding apparatus comprising, in combination, a main frame, a support for a welding blank mounted on said frame, a base slidably mounted on said frame, a second support for a welding blank slidably mounted on said base and disposed to permit the mutual engagement of said blanks, a pair of bearing members mounted on said base, an internally-threaded nut rotatably disposed in one of said bearing members, a bevel gear secured to said nut and disposed to rotate therewith, a ring gear, a motor for rotating said ring gear, a pair of bevel gears rotatably mounted within said ring gear and disposed to engage said first-mentioned bevel gear, a drive gear disposed to engage said pair of bevel gears, a shaft rotatably mounted within the other of said bearing members and secured to said drive gear, a crank arm secured to said shaft, a second crank arm, a second motor for rotating said second crank arm, a resilient connection between said crank arms for transmitting a reciprocating movement to said first-named crank arm, a toggle mechanism connected at one end to said base and at the other end to said main frame, fluid pressure means connected to said toggle joint for causing the base to slide along the main frame, and manually-operable means for controlling said fluid pressure means.

5. Welding aparatus comprising, in combination, means for supporting parts on which a welding operation is to be performed, a welding circuit connected to said parts, a motor having driving engagement with at least one of said parts for causing them to repeatedly engage and disengage for drawing and extinguishing an arc produced therebetween by said welding circuit, and means disposed to cooperate with said motor for compensating for the burning away of said parts during the welding operation.

6. Welding apparatus comprising, in combination, means for supporting parts on which a welding operation is to be performed, a welding circuit connected to said parts, a motor having driving engagement with at least one of said parts for causing them to repeatedly engage and disengage for drawing and extinguishing an arc produced therebetween by said welding circuit, and a second motor also having driving engagement with at least one of said parts for compensating for the burning away thereof during the welding operation.

7. Welding apparatus comprising, in combination, means for supporting parts on which a welding operation is to be performed, a welding circuit connected to said parts, a differential gear unit connected to one of said parts, a motor connected to said gear unit and adapted to impart thereto an oscillatory motion thereby causing said parts to repeatedly engage and disengage for drawing and extinguishing an arc produced therebetween by said welding circuit, and a second motor connected to continually drive said gear unit to advance the part to be welded connected thereto for compensating for the burning away of said parts during the welding operation.

WILHELM RAUPACH.
FRIEDRICH KALKNER.